(12) United States Patent
Xu

(10) Patent No.: US 7,151,755 B2
(45) Date of Patent: Dec. 19, 2006

(54) METHOD AND SYSTEM FOR MULTI-CELL INTERFERENCE REDUCTION IN A WIRELESS COMMUNICATION SYSTEM

(75) Inventor: Guanghan Xu, Garland, TX (US)

(73) Assignee: Navini Networks, Inc., Richardson, TX (US)

( * ) Notice: Subject to any disclaimer, the term of this patent is extended or adjusted under 35 U.S.C. 154(b) by 1078 days.

(21) Appl. No.: 10/226,767

(22) Filed: Aug. 23, 2002

(65) Prior Publication Data

US 2004/0081121 A1    Apr. 29, 2004

(51) Int. Cl.
*H04Q 7/00*    (2006.01)
(52) U.S. Cl. .................... 370/330; 370/436
(58) Field of Classification Search ............. 370/332, 370/330, 329, 317, 318, 321, 459, 314, 436
See application file for complete search history.

(56) References Cited

U.S. PATENT DOCUMENTS

| | | | |
|---|---|---|---|
| 5,768,254 A | 6/1998 | Papadopoulos et al. ..... 370/201 |
| 6,006,092 A * | 12/1999 | Ward ......................... 455/438 |
| 6,195,327 B1 | 2/2001 | Lysejko et al. ............. 370/201 |
| 6,253,063 B1 * | 6/2001 | Cudak et al. ............... 455/63.1 |
| 6,563,806 B1 * | 5/2003 | Yano et al. .................. 370/330 |

* cited by examiner

*Primary Examiner*—Brenda Pham
(74) *Attorney, Agent, or Firm*—Preston Gates & Ellis LLP

(57) ABSTRACT

A method and system for multi-cell interference reduction in a wireless communication system is disclosed. The present disclosure describes a new method and system for accurately detecting the characteristics of the interfering signals from relevant sources such as neighboring co-channel cells and other persistent interference sources. In order to better estimate the interfering signals, a base station designates a small inactive window in the transmit frame for a cell during which the communications between the base station and its terminals are reduced while every other communication pursues. As such, the interfering signals can be well exposed and the characteristics can be accurately detected. Based on the detected characteristics of the interfering signals, the base station can specifically design beam forming mechanism or other means to cancel or minimize the impact of such interference during regular communications.

41 Claims, 3 Drawing Sheets

METHOD AND SYSTEM FOR MULTI-CELL INTERFERENCE REDUCTION IN A WIRELESS COMMUNICATION SYSTEM

BACKGROUND OF THE INVENTION

The present invention relates to wireless communication system in general, and more particularly, to a method and system for multi-cell interference reduction in a wireless communication system.

A wireless communication system involves a cellular structure where a call control and management device such as a base station is placed at the center of a cell and communicate with a number of terminals such as handsets or other communication devices using a predetermined frequency band. Since the frequency spectrum for wireless communications is a diminishing resource, it is desirable to increase the spectrum efficiency by sharing the same frequency band with multiple cells and implementing the so-called N=1 frequency reuse mechanism.

As it is well known, when the base station transmits signals to the terminal, the communication is referred to as a downlink communication. Similarly, when the terminal transmits signals back to the base station, it is known as an uplink communication. During both the uplink and downlink communications, the receivers of base stations or terminals receive the combination of the signals of interest and interfering communication signals transmitted from neighboring cells or other sources including persistent noises such as the thermal noise. With proper preprocessing such as channelization and CDMA despreading, it may be possible to enhance the signal of interest and suppress any interference and noise components. However, when the power levels of interference components are significantly higher than those of the signals of interest, a sufficiently high signal to interference and noise ratio is hard to obtain to assure a correct detection of the signals of interest or the underlying digital symbols. To alleviate the signal detection difficulty, numerous blind algorithms have been developed based on the unique signal properties such as finite-set, cyclostationarity, and constant modulus properties. Unfortunately, these algorithms may not be so effective due to the fact that many interfering signals are generated by other base stations or their corresponding terminals which use a same frequency band as or an overlapping frequency band with the one carrying the signals of interest, thereby inevitably possessing the same signal properties. Moreover, these algorithms are usually computationally intensive and require a significant number of data samples to have satisfactory performance.

What is needed is a simple and effective method and system for detecting and canceling the multi-cell interference.

SUMMARY OF THE INVENTION

A method and system for multi-cell interference reduction for either uplink or downlink or both is disclosed. The present disclosure describes a new method for accurately detecting the characteristics of the interfering signals from relevant sources such as neighboring co-channel cells and other persistent interference sources. In order to better estimate the interfering signals, a base station designates a small inactive window in the transmit frame for a cell during which the communications between the base station and its terminals are reduced while every other communication pursues. As such, the interfering signals can be well exposed and the characteristics can be accurately detected. Based on the detected characteristics of the interfering signals, the base station can specifically design beamforming mechanism or other means to cancel or minimize the impact of such interference during regular communications.

Even if only a single antenna is used for a base station or a terminal and the interference cancellation is not possible, the inactive time slots/windows also allow the base stations and terminals to calculate the interference power more accurately and separate the interference from other cells and from the signals within the cell such as the intersymbol or interchip interference (ISI or ICI). For a CDMA wireless communication system, the accurate estimation of the ISI or ICI impact can also help to find the maximum number of code channels can be supported for the link given certain performance requirements for certain modulation schemes.

DESCRIPTION OF THE PREFERRED EMBODIMENT

The present disclosure introduces a unique inactive time slot/window for each cell in each transmit frame for either uplink or downlink or both such that only the interferences generated from other cells will show in the inactive time slot. The characteristics of all interfering signals are thus captured and used for canceling such signals in the remaining portion of the transmit frame. As opposed to the inactive time slot, the remaining portion within the transmit frame may also be referred to as the active window since wireless communications are actively carried out as normal.

Figure 1:
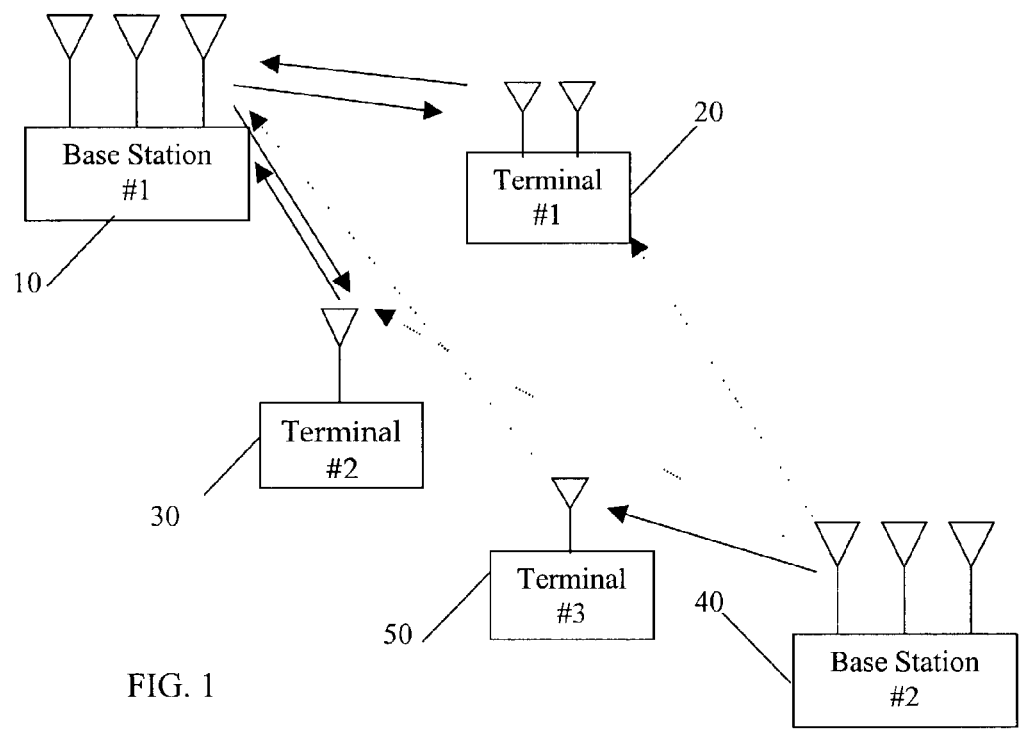
FIG. 1 illustrates a multi-cell wireless communication system with a frequency reuse N=1 configuration.

FIG. 1 shows a simplified multi-cell wireless communication system wherein a call control and management device such as a first base station 10 communicates with its terminals 20 and 30, and a second base station 40 using the same or overlapping frequency band communicates with its own terminals such as terminal 50. Whether the territory/cell covered by the first base station is immediately adjacent to the cell covered by the second base station geographically or otherwise, as long as the two base stations use the same frequency band for communications with their respective terminals, these two cells are deemed as neighboring cells in a multi-cell communication environment.

When the communications are carrying out between the base stations and the terminals, the signals of interest may be received with undesired signals or noises that interfere with the signals of interest. For example, during the uplink communications, the first base station does not only receive the signals from terminals 20 and 30 in its own cell, but also receives signals from terminal 50 which are meant to be sent to base station 40. For the downlink communications, terminal 20 receives not only the signal meant to be sent for it from the first base station, but also signals from the second base station which intends only for terminal 50. The signals from the second base station thus becomes interference to terminal 20, thereby complicating the signal detection and estimation at terminal 20. In addition to the interfering signals generated by the second base station, other neighboring base stations can cause similar interference effect as long as the same or overlapping frequency band is used. In addition to these interfering signals, there are other persistent noises in the system that are normally "bundled together" with the signals of interest.

The inter-cell interference such as the interference from terminal 20 to detection of the signal from terminal 30 for uplink can be canceled by channelization such as CDMA despreading for FDMA signals, Fourier Transform for OFDM signals, filtering for frequency-division-multiple-access (FDMA) signals, and time separation for time-division-multiple-access (TDMA) signals. The joint detection or multiple user detection techniques can also be implemented to further cancel the intra-cell interference, which is further described in U.S. Pat. No. 5,905,721. However, the multi-cell interference is usually more difficult to cancel since the channelization among multiple cells such as frequency reuse may cause significant reduction in the spectrum efficiency.

In order to battle against the multi-cell interference and other persistent noises, a unique inactive time slot or a number of inactive time slots are designed and placed within each transit frame of the communication of interest such that all interfering signals are exposed while the signals of interest are absent. The characteristics of the exposed interfering signals can be detected and used for the elimination or reduction thereof after the inactive time slot lapses. For example, during the inactive time slot, the first base station and its terminals do not transmit or transmit at power levels that are detectably lower than normal. It is noted that the term "inactive time slot" does not indicate that absolutely no radio signals are "leaked" from the base station or its terminals. It would be ideal if the system can eliminate all radio signals, but practically, there will be a small amount of signals in existence. As long as the leaked signals can be clearly detected due to differentiating factors such as the power level, then the allocation of the inactive time slot has served its purpose. It is also noted that the concept of having a small inactive time/channel interval can be applied to many wireless communication systems employing different technologies including code division multiple access (CDMA), frequency division duplex (FDD), and time division duplex (TDD) based systems.

Figure 2:
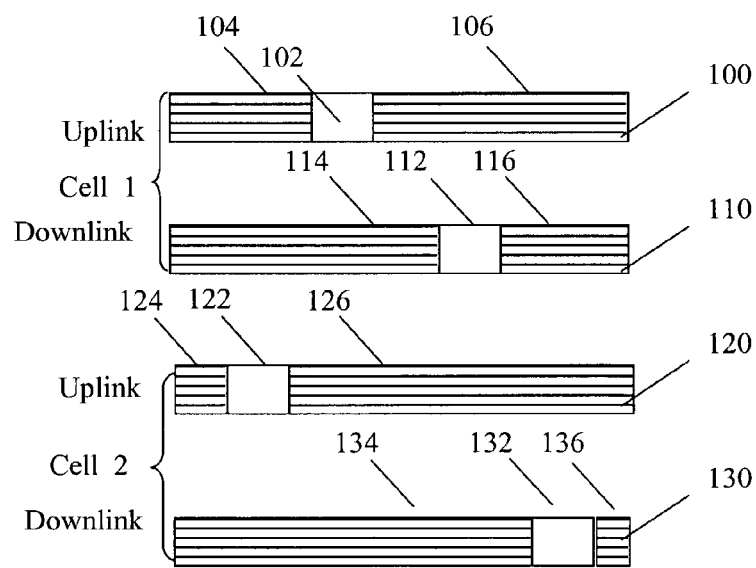
FIG. 2 illustrates a signal transmission pattern in a transit frame that contains an inactive time slot in a frequency division duplex (FDD) system.

FIG. 2 illustrates a signal transmission pattern in a transit frame that contains an inactive time slot in an FDD system. For illustration purposes, it is assumed that Cell 1 has a neighboring Cell 2 that is in interference therewith. For each cell, transmit frames for both the uplink and downlink communications are shown. Within the uplink transmit frame 100, an inactive time slot 102 is configured to be in a predetermined location. There are other portions of the transmit frame such as the time slot 104 before the inactive time slot and the time slot after the inactive time slot 106 in which normal communications between the terminals and the first base station ensue. Similarly, for downlink communication, the transmit frame 110 has an inactive time slot 112, a pre-inactive slot 114, and a post-inactive slot 116. For Cell 2, a similar configuration is implemented wherein the transmit frame 120 has an inactive time slot 122, a pre-inactive slot 124, and a post-inactive slot 126, and the transmit frame 130 has an inactive time slot 132, a pre-inactive slot 134, and a post-inactive slot 136. For maximizing the benefit of having this small inactive time slot structure, the inactive time slot 102 of Cell 1 is configured not to overlap with the inactive time slot 122 of Cell 1. Likewise, for the downlink communications, the inactive time slot 112 does not overlap with its counterpart 132. It is further understood that Cell 2 is shown in FIG. 2 only as one example of all interfering cells, there could be many other interfering cells whose respective inactive time slots locate in different locations in the transmit frame. The respective base stations must cooperate to assure that the inactive time slots of neighboring cells do not have any overlapping area, or have minimum overlapping areas possible.

Although it is best to use the estimation of interfering signals during the inactive time slot during uplink transmit frame to minimize the effect thereof on the remaining portion of the transmit frame for uplink communications, it is also feasible under certain circumstances, to use the estimate made during the uplink transmit frame to reduce the interferences for the downlink communications. Similarly, estimation of the interferences made during the downlink communications can be used for the uplink communications. In particular, when the base station, which normally has more calculation power than the terminal, has gone through lengthy analysis about the interfering signals during an uplink inactive time slot, it can broadcast the characteristics of the interfering signals to the terminals so that the terminals can better detect signals of interest during next downlink period since they have a better profile of the possible interferences.

In order to avoid overlapping inactive time slots, the base stations will broadcast the time interval configured for the inactive time slots. The broadcasted information reaches its covered terminals as well as other neighboring base stations. Since the inactive time slots are very small in size, and there are limited number of neighboring cells, it should be feasible for each base station to reconcile any time conflict for placing the inactive time slots. The knowledge of the inactive time slots can be obtained after demodulating the broadcast signals. Another method of finding the positions of the inactive time slots is to detect a significant drop of the power levels across the time frame. The embodiment of this invention should also include the cases where the inactive time slots may not appear in every time frame or may not appear in both links. For example, the inactive time slots may only be implemented for uplink or downlink transmit frames, but not both.

Figure 3:
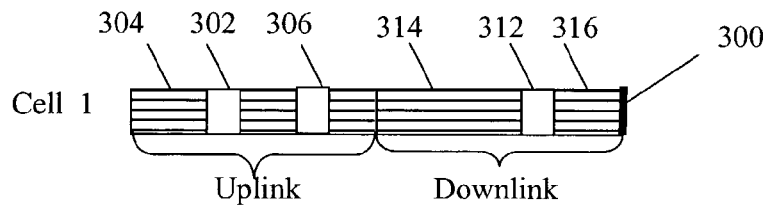
FIG. 3 illustrates a signal transmission pattern in a transit frame that contains an inactive time slot in a time division duplex (TDD) system.
Figure 3:
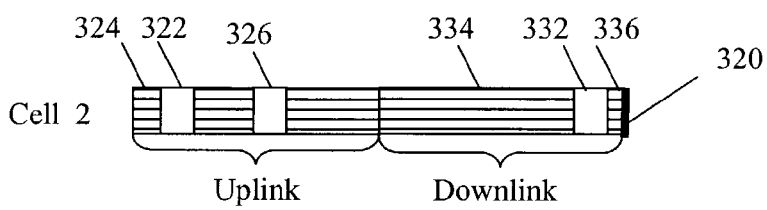

FIG. 3 illustrates a signal transmission pattern in a transit frame that contains an inactive time slot in a time division duplex (TDD) system. This TDD system is very similar to the FDD system shown in FIG. 2 in terms of implementing the inactive time slot. In this case, the fact that the uplink and downlink communication time periods are time divided in a sequential manner does not affect the configuration of the non-overlapping inactive time slots in Cell 1 and Cell 2. It is also shown that within one transmit frame, more than one inactive time slots can be included. For example, two inactive time slots 302 and 306 are used within one uplink transmit frame for more accurately estimating the interfering signals for Cell 1. Similarly, for Cell 2, two inactive time slots 322 and 326 are configured to be placed in a location not in conflict with the inactive time slots 302 and 306 of Cell 1.

With the active time slots defined, several implementation schemes can be used to detect the characteristics of the interference, and such detected information may be further used for better adjusting the beamforming for targeted terminals.

Figure 4:
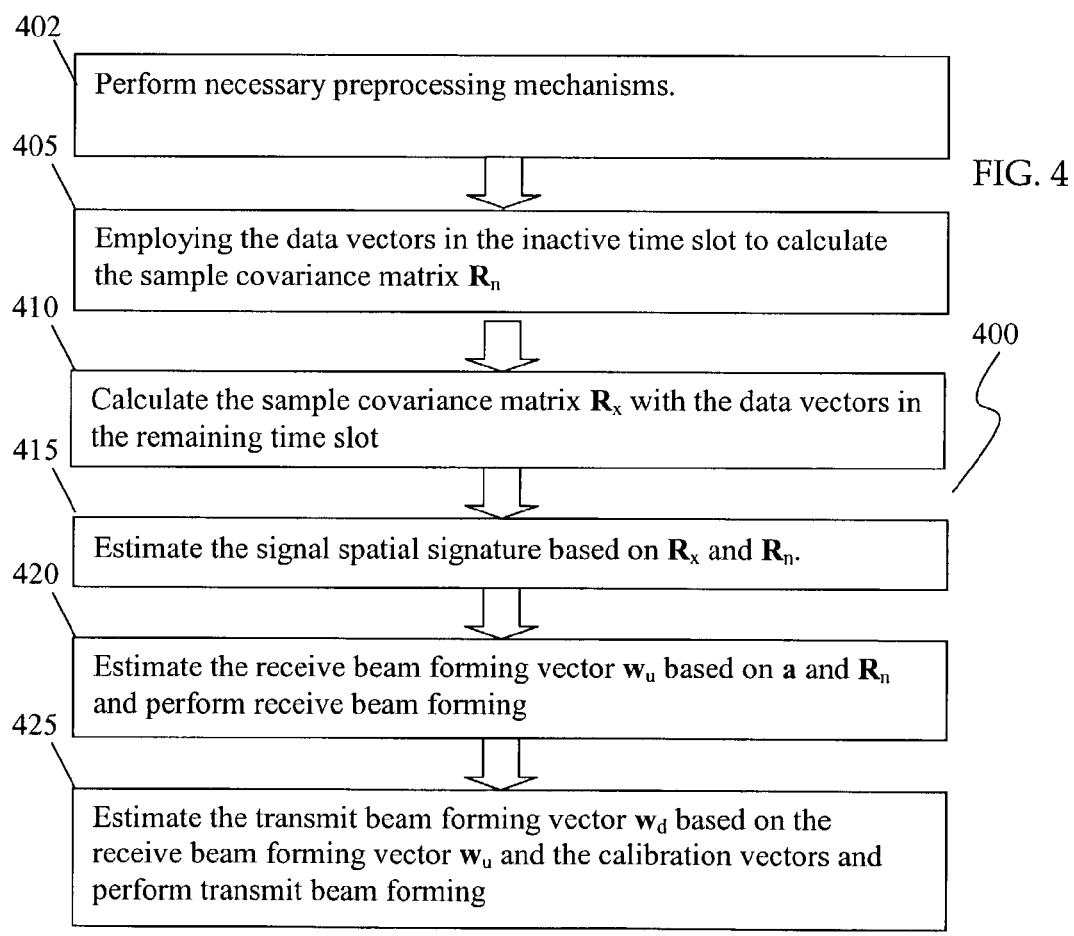
FIG. 4 is a flow diagram illustrating steps for reducing the multi-cell interference based on information acquired in the inactive time slot.

FIG. 4 is a flow diagram 400 illustrating steps for reducing the multi-cell interference based on information acquired in the inactive time slot assuming that the receiver contains multiple spatially separated antennas and RF receivers. The same method applies to a base station as well as a terminal with multiple spatially separated antennas and receivers. Without loss of generality, the algorithms for detecting and canceling interference in the uplink are described in detail below and it is understood that similar process can be done for downlink direction. In step 402, a signal expected to be transmitted first goes through necessary preprosessing such as filtering, Fourier transform, or CDMA dispreading, or any other similar well-known processing mechanisms. For example, if the multiple access scheme is the OFDM, a fast Fourier transform (FFT) is performed to isolate the signal into multiple tones. For FDMA signals, filtering mechanism are used to decompose a wideband signal into multiple narrow-band signals. For CDMA signals, the despreading is done to extract each code channel symbols from a wideband signal.

A sample covariance matrix $R_n$ is then calculated using data vectors obtained during the inactive time slot in step 405 as $R_n=[x(1)x^*(1)+x(2)x^*(2)+ \ldots +x(N)x^*(N)]/N$, where $x(n)$ is the data vector after preprocessing at time index "n" during the inactive time slots and N is the number of data vector samples used. Then, step 410 calculates the sample covariance matrix $R_x$ of the signal of interest, $R_x=[x(1)x^*(1)+x(2)x^*(2)+ \ldots +x(N)x^*(N)]/N$, where $x(n)$ is the data vector after preprocessing at time index "n" during the active windows and N is the number of data vector samples used. In step 415, the signal spatial signature (mathematically represented as "a") is estimated based on $R_x$ and $R_n$. One method is to apply the generalized eigendecomposition of $R_x$ and $R_n$. For illustration purposes, it is assumed that $[\Box_i, e_i]$ are the i-th largest generalized eigenvalue and its corresponding generalized eigenvector of the matrix pencil $\{R_x, R_n\}$, such that $R_x e_i=\Box_i R_n e_i$ (in this case, $a=e_1$). In another embodiment, the spatial signature is estimated by calculating the inverse of the square root of the matrix $R_n$, $R_n^{-1/2}$, calculating vector $z(n)=R_n^{-1/2}x(n)$ for $n=1, \ldots, N$, where N is the number of the samples adequate for estimating the spatial signatures, finding the index k such that the k-th element of the vector $z(n)$, $z_k(n)$, has the maximum power, and estimating the spatial signature a by calculating $a=z(1)^*z_{k^*}(1)+ \ldots +z(N)z_{k^*(N)}$.

An estimation of a receive/uplink beam forming vector $w_u$ is done based on a and $R_n$ in step 420. One method of finding $w_u$ is to let $w_u=R_n^{-1}a$. If the condition number of $R_n$ is larger than certain threshold, $R_n^{-1}$ will be replaced by the pseudo inverse of $R_n$, i.e., $R_n^\#$. With the beamforming vector $w_u$, a receive beam forming is performed accordingly by the following equation, i.e., $y(n)=w_u^*x(n)$, where $y(n)$ is the n-th sample of the beamformed result and $x(n)$ is the n-th sample of the data vectors in the active time window, and where * denotes the complex conjugate of the vector $w_u$. The communication signals received during the remaining portion of the transmit frame are then appropriately demodulated based on $y(n)$. Similarly, in step 425, a transmit/downlink beam forming vector $w_d$ is estimated based on a receive beam forming vector $w_u$ and calibration vectors.

One method of finding the downlink beamforming vector $w_d$ is to perform appropriate nulling on downlink, i.e., $w_d=w_u^*diag(r) diag(t)^{-1}$, where r and t are the receive and transmit calibration vectors, respectively, conj( ) denotes complex conjugate, and diag( ) makes a diagonal matrix whose diagonal elements are the elements of the vector in the parenthesis. To maximize the power to a particular terminal, use $w_d=a^*conj[diag(t)diag(r)^{-1}]$, where conj[ ] denotes complex conjugate. The base station then performs the transmit beam forming for a particular terminal as follows, $b(n)=w_d s(n)$, where $s(n)$ is the modulated signal for the terminal and $b(n)$ is the transmit signal for all the transmitter array.

In addition to the process described above for detecting the characteristics of the interfering signals, a terminal of the base station, if equipped with necessary resources, can also detect the characteristics of the interfering signals and send one or more feedback messages to the base station suggesting, in a CDMA based system for example, predetermined subcarrier assignment for the terminal for the remaining portion of the transmit frame. The feedback message may indicate whether the communication network is a wide band multi-carrier wireless communication system.

Figure 5:
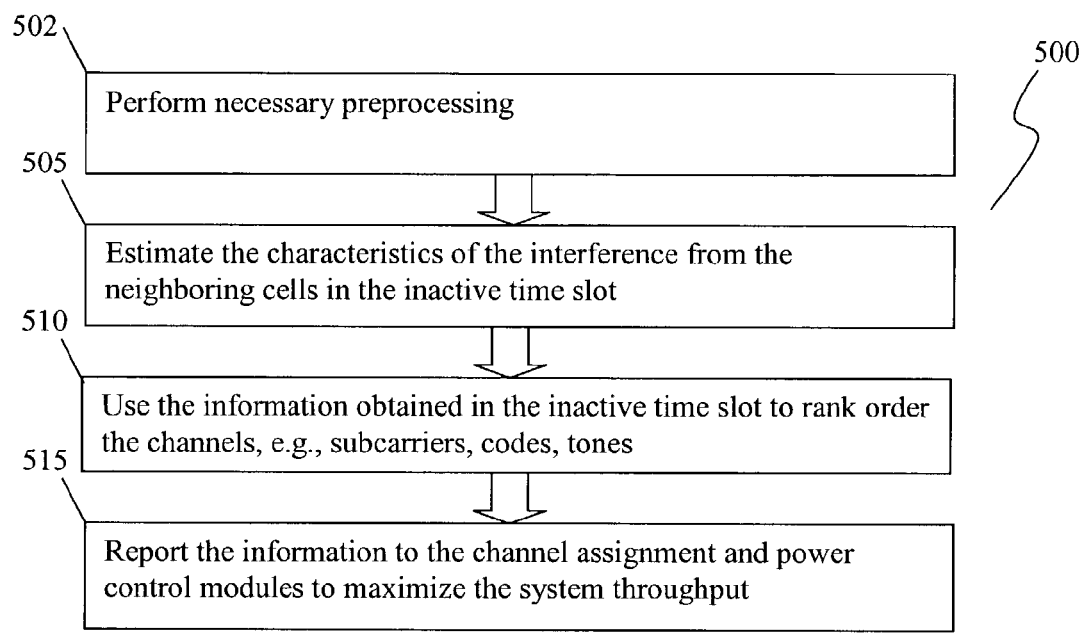
FIG. 5 is a flow diagram illustrating steps for assigning channels based on the estimation of the interference.

FIG. 5 is a flow diagram 500 illustrating steps for assigning channels based on the estimation of the interference for a CDMA based or a multi-carrier CDMA system. In step 502, well known preprocessing is done on the signal ready to be transmitted. The profile of the interfering signals is characterized by analyzing the interfering signals received during the inactive time slot. For example, the power levels of the interfering signals in different code channels are ranked in an order in step 510. As the communications technology varies from system to system, the power levels of the interfering signals can also be ranked based on subcarriers in a multi-carrier wireless communication system, based on codes or frequency tones, etc. After the profile of the interfering signals is known, the profile information is used to cancel or reduce the interference, or assigning the communication frequencies or channels or performing power control intelligently. In one example, for a wideband multi-carrier wireless communications system, the ranked subcarriers are prioritized for channel assignment thereto. The profile information is reported to the channel assignment and power control modules of the base station. Since the interference from other cells behave differently in different geographical locations and since each terminal may not use all the subcarriers for communications, the knowledge of the interference in all the subcarriers can allow the base station to assign subcarriers more efficiently to maximize the overall system throughput or capacity of the wireless communication system. Similarly, the base station may perform OFDM demodulation to estimate the power levels of the interfering signals in all relevant frequency tones, and assigning frequency tones with interfering signals of relative lower power levels.

Once the profile or characteristics of the interfering signals are known to the base station or the terminals, one way for canceling or reducing the interfering signals is maximizing a signal to interference and noise ratio (SINR) of communication signals of interest transmitted between the base station and its terminals during the remaining portion of the transit frame.

In addition, it is also feasible to take advantage of the power information of the neighboring cells and thermal noise to calculate the self-interference among the channels (e.g., codes) from the same terminal or from other channels that are covered by the same base station. Since such self-interference increases typically increases its strength in proportional to the signal powers, if the self-interference is dominating, it does not necessarily improve the SINR by increasing the signal power. However, if the interference from other cells and thermal noise are dominating, increasing the signal power does brings the SINR higher. Therefore, by separating the self-interference from the aggregated interference, the power control can be performed more efficiently.

As described above, the interference reduction taking advantage of the inactive time slots can be implemented through both the base station and the terminals. These two ends of the communications can cooperate to make channel assignment and interference reduction more efficient. Since conventionally, the base station has more processing capacity than the terminal, estimation of the profile of the interference can be done there. However, as the terminal gets more intelligent, a lot of the analysis can also be done on the terminal. As mentioned above, the terminal can send a feedback message to the base station about the channel, subcarrier, or frequency assignment. Similarly, the improved beam forming mechanism is not limited to the base station side, it can be also implemented on the terminal side. For example, receive beam forming vectors with predetermined compensation based on both the receive and transmit calibration results are employed as corresponding transmit beam forming vectors in a TDD system.

Even if only a single antenna is used for a base station or a terminal and the complete interference cancellation is not possible, interference information derived from the inactive time slot also helps the base stations and terminals to calculate the interference power more accurately and separate more efficiently the interference signals from other cells and from the signals within the cell such as the intersymbol or interchip interference (ISI or ICI).

In some wireless communication systems, the SINR is a critical criteria for power control, interference profile derived is then important for more accurate power control. If the interference is primarily caused by the multipath, i.e., ICI or ISI, it does not make sense to significantly increase the SINR by raising the power of the signal of interest. If the interference largely comes from other cells, then raising the signal power may be helpful for enhancing quality of the concerned communication link. For a CDMA wireless communication system, the accurate estimation of the ISI or ICI impact can also help to find the maximum number of code channels that can be supported for the communication link considering other performance requirements for certain modulation schemes, such as QPSK, 8PSK, QAM16, QAM32, etc.

The above disclosure provides several different embodiments, or examples, for implementing different features of the disclosure. Also, specific examples of components, and processes are described to help clarify the disclosure. These are, of course, merely examples and are not intended to limit the disclosure from that described in the claims.

While the disclosure has been particularly shown and described with reference to the preferred embodiment thereof, it will be understood by those skilled in the art that various changes in form and detail may be made therein without departing from the spirit and scope of the disclosure.

What is claimed is:

1. A method for reducing multi-cell interference in a wireless communication system, the wireless communication system having a first base station whose communication signals with its covered terminals are interfered by communication signals transmitted between at least one interfering base station and its covered terminals, the method comprising:

configuring, by the first base station, at least one inactive time slot in a transmit frame during which communications with its covered terminals are detectably reduced while communications between the at least one interfering base station and its covered terminals are maintained as normal; and detecting characteristics of interfering signals generated by the communications between the at least one interfering base station and its terminals during the inactive time slot;

canceling the interfering signals by increasing a signal to interference and noise ratio of communication signals transmitted between the first base station and its terminals during the remaining portion of the transit frame based on the detected characteristics of the interfering signals.

2. The method of claim 1 wherein the inactive time slot is configured to be in an uplink communication time period.

3. The method of claim 1 wherein the inactive time slot is configured to be in a downlink communication time period.

4. The method of claim 1 wherein the communications between the first base station and its terminals are configured to have power levels detectably lower than those for the communications between the at least one interfering base station and its terminals.

5. The method of claim 1 wherein detecting further comprises detecting other interfering signals from persistent noise generating sources.

6. The method of claim 1 wherein the increasing further comprises:

estimating signal spatial signatures based on at least a portion of data vectors received from the inactive time slot; and estimating a beam forming vector to maximize the signal to interference and noise ratio.

7. The method of claim 1 wherein the increasing further comprises:

performing predetermined preprocessing to extract a signal of interest $x(n)$, where n is the time index, from received data for each communication receiver in the remaining portion of the transmit frame;

accumulating one or more sample covariance matrices based on $x(n)$ and one or more data vectors received from the inactive time slot, $R_x$ and $R_n$, respectively, estimating a spatial signature of the signal a by calculating a generalized eigenvector of a matrix pencil $(R_x, R_n)$ corresponding to the largest generalized eigenvalue, estimating an uplink beamforming weight vector w with the equation $w=R_n^{-1}a$, performing an uplink beamforming by $y(n)=w^*x(n)$, where * denotes the complex conjugate of the vector w; and demodulating the communication signals based on $y(n)$.

8. The method of claim 7 wherein estimating the spatial signature further comprises:

calculating the inverse of the square root of the matrix $R_n$, $R_n^{-1/2}$;

calculating $z(n)=R_n^{-1/2}x(n)$ for $n=1, \ldots, N$, where N is the number of the samples adequate for estimating the spatial signatures;

finding the index k such that the k-th element of the vector $z(n)$, $z_k(n)$, has the maximum power, estimating the spatial signature a by calculating $a=z(1)*z_k*(1)+\ldots+z(N)z_k*(N)$.

9. The method of claim 1 wherein the increasing further comprises:

performing predetermined preprocessing to extract a signal of interest $x(n)$, where n is the time index, from data received for each communication receiver in the remaining portion of the transmit frame;

accumulating one or more sample covariance matrices based on x(n) and one or more data vectors received from the inactive time slot, $R_x$ and $R_n$, respectively, estimating a spatial signature of the signal a by calculating a generalized eigenvector of a matrix pencil ($R_x$, $R_n$) corresponding to the largest generalized eigenvalue, estimating an uplink beamforming weight vector w with the equation $w=R_n^{\#}a$, where # denotes a pseudo inverse operation;

performing an uplink beamforming by $y(n)=w^*x(n)$, where * denotes the complex conjugate of the vector w; and demodulating the communication signals based on y(n).

10. The method of claim 1 wherein the increasing further comprises performing downlink beamforming by the first base station to a selected terminal by selecting a predetermined downlink beamforming vector.

11. The method of claim 1 wherein the wireless communication network is a wideband multi-carrier wireless communication system, the detecting further comprises:
estimating one or more interference power levels for one or more subcarriers during the inactive time slot; and
ranking the subcarriers based on the power estimation for channel assignment thereof.

12. The method of claim 1 wherein the detecting further comprises, during the inactive time slot, the first base station performing OFDM demodulation to estimate one or more power levels of the interfering signals in all relevant frequency tones.

13. The method of claim 12 further comprising assigning frequency tones with interfering signals of lower power levels.

14. The method of claim 1 further comprising detecting, by at least one terminal of the first base station, characteristics of interfering signals by performing spectral analysis.

15. The method of claim 14 further comprising sending one or more feedback messages to the first base station suggesting a predetermined subcarrier assignment for the terminal for the remaining portion of the transmit frame.

16. The method of claim 15 wherein at least one of the feedback messages suggesting subcarrier assignment indicates if the wireless communication network is a wide band multi-carrier wireless communication system.

17. The method of claim 1 further comprising improving, by the first base station transmit beam forming for communicating to at least one of its terminals to minimize downlink multi-cell interference.

18. The method of claim 17 wherein the improving comprises employing receive beam forming vectors with predetermined compensation based on both receive and transmit calibration results as corresponding transmit beam forming vectors if the communications between the first base station and the terminal is based on time division-duplex technology.

19. The method of claim 1 further comprising improving, by at least one terminal of the first base station, transmit beam forming for communicating to the first base station to minimize uplink multi-cell interference.

20. The method of claim 19 wherein the improving further comprises employing one or more receive beam forming vectors with predetermined compensation based on both receive and transmit calibration results as corresponding transmit beam forming vectors if the communications between the first base station and the terminal is based on time division-duplex technology.

21. The method of claim 1 further comprising broadcasting, by the first base station, a location of the inactive time slot during the transmit frame.

22. A system for reducing multi-cell interference in wireless communications, wherein a first base station whose communication signals with its covered terminals are interfered by communication signals transmitted between at least one interfering base station and its covered terminals, the system comprising:
means for configuring at least one inactive time slot in a transmit frame during which communications between the first base station and its covered terminals are detectably reduced while communications between the interfering base station and its covered terminals are maintained at predetermined levels; and
means for detecting characteristics of interfering signals generated by the communications between the at least one interfering base station and its terminals during the inactive time slot;
means for canceling the interfering signals by increasing a signal to interference and noise ratio of communication signals transmitted between the first base station and its terminals during the remaining portion of the transmit frame based on the detected characteristics of the interfering signals.

23. The system of claim 22 wherein the inactive time slot is configured to be in an uplink communication time period.

24. The system of claim 22 wherein the inactive time slot is configured to be in a downlink communication time period.

25. The system of claim 22 wherein the communications between the first base station and its terminals are configured to have power levels detectably lower than those for the communications between the at least one interfering base station and its terminals.

26. The system of claim 22 further comprises:
means for estimating signal spatial signatures based on at least a portion of data vectors received from the inactive time slot; and
means for estimating a beam forming vector to maximize the signal to interference and noise ratio.

27. The system of claim 22 further comprises means for:
performing predetermined preprocessing to extract a signal of interest x(n), where n is the time index, from received data for each communication receiver in the remaining portion of the transmit frame;
accumulating one or more sample covariance matrices based on x(n) and one or more data vectors received from the inactive time slot, $R_x$ and $R_n$, respectively;
estimating a spatial signature of the signal a by calculating a generalized eigenvector of a matrix pencil ($R_x$, $R_n$) corresponding to the largest generalized eigenvalue;
estimating an uplink beamforming weight vector w with the equation $w=R_n^{-1}a$;
performing an uplink beamforming by $y(n)=w^*x(n)$, where * denotes the complex conjugate of the vector w; and
demodulating the communication signals based on y(n).

28. The system of claim 27 wherein means for estimating the spatial signature further comprises means for:
calculating the inverse of the square root of the matrix $R_n$, $R_n^{-1/2}$;
calculating $z(n)=R_n^{-1/2}x(n)$ for $n=1, \ldots, N$, where N is the number of the samples adequate for estimating the spatial signatures;
finding the index k such that the k-th element of the vector z(n), $z_k(n)$, has the maximum power; and estimating the spatial signature a by calculating $a=z(1)*z_k*(1)+\ldots+z(N)z_k*(N)$.

29. The system of claim 22 further comprises means for:
performing predetermined preprocessing to extract a signal of interest $x(n)$,
where n is the time index, from data received for each communication receiver in the remaining portion of the transmit frame;
accumulating one or more sample covariance matrices based on $x(n)$ and one or more data vectors received from the inactive time slot, $R_x$ and $R_n$, respectively;
estimating a spatial signature of the signal a by calculating a generalized eigenvector of a matrix pencil $(R_x, R_n)$ corresponding to the largest generalized eigenvalue;
estimating an uplink beamforming weight vector w with the equation $w=R_n^\#a$, where # denotes a pseudo inverse operation;
performing an uplink beamforming by $y(n)=w*x(n)$, where * denotes the complex conjugate of the vector w; and
demodulating the communication signals based on $y(n)$.

30. The system of claim 22 wherein if the wireless communications are conducted in a wideband multi-carrier wireless communication system, the means for detecting further comprises means for:
estimating one or more interference power levels for one or more subcarriers during the inactive time slot; and
ranking the subcarriers based on the power estimation for channel assignment thereof.

31. The system of claim 22 wherein the means for detecting further comprises means for, during the inactive time slot, the first base station to perform OFDM demodulation to estimate one or more power levels of the interfering signals in all relevant frequency tones.

32. The system of claim 31 further comprising means for assigning frequency tones with interfering signals of lower power levels.

33. The system of claim 22 further comprising means for detecting, by at least one terminal of the first base station, characteristics of interfering signals by performing spectral analysis.

34. The system of claim 33 further comprising sending one or more feedback messages to the first base station suggesting a predetermined subcarrier assignment for the terminal for the remaining portion of the transmit frame.

35. The system of claim 34 wherein at least one of the feedback messages suggests subcarrier assignment if the wireless communications are done in a wide band multicarrier wireless communication system.

36. The system of claim 22 further comprising means for improving, by the first base station, transmit beam forming for communicating to at least one of its terminals to minimize downlink multi-cell interference.

37. The system of claim 36 wherein the means for improving comprises means for employing receive beam forming vectors with predetermined compensation based on both receive and transmit calibration results as corresponding transmit beam forming vectors if the communications between the first base station and the terminal is based on time-division-duplex technology.

38. The system of claim 22 further comprising means for improving, by at least one terminal of the first base station, transmit beam forming for communicating to the first base station to minimize uplink multi-cell interference.

39. The system of claim 38 wherein the means for improving further comprises means for employing one or more receive beam forming vectors with predetermined compensation based on both receive and transmit calibration results as corresponding transmit beam forming vectors if the communications between the first base station and the terminal is based on time-division-duplex technology.

40. The system of claim 22 further comprising means for broadcasting, by the first base station, a location of the inactive time slot during the transmit frame.

41. The method of claim 22 further comprising performing downlink beamforming by the first base station to a selected terminal by selecting a predetermined downlink beamforming vector based on the detected characteristics of interfering signals.

* * * * *